T. H. ALFREDS.
ANTIFRICTION SIDE BEARING.
APPLICATION FILED DEC. 7, 1918.

1,306,875.

Patented June 17, 1919.
2 SHEETS—SHEET 1.

Witnesses:
D. Darrenougue
Eugene C. Warn

Inventor
Torris H. Alfreds
by Clarence E. Mehlhope, Atty

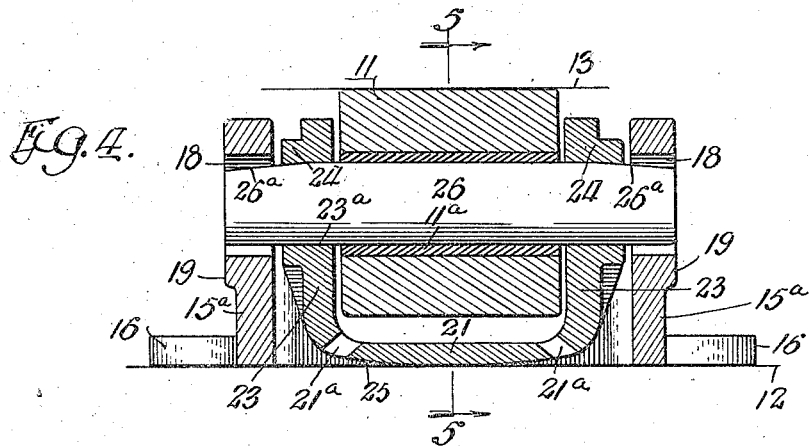
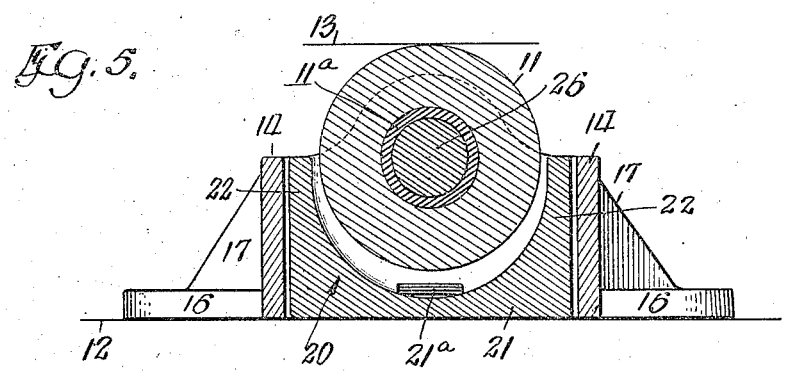
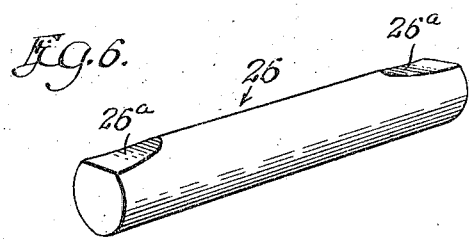

UNITED STATES PATENT OFFICE.

TORRIS H. ALFREDS, OF CHICAGO, ILLINOIS, ASSIGNOR TO ALBERT G. WELCH, TRUSTEE UNDER THE WILL OF EDWIN S. WOODS, DECEASED.

ANTIFRICTION SIDE BEARING.

1,306,875.　　　Specification of Letters Patent.　　Patented June 17, 1919.

Application filed December 7, 1918. Serial No. 265,701.

*To all whom it may concern:*

Be it known that I, TORRIS H. ALFREDS, a citizen of the United States, and a resident of Chicago, in the county of Cook and State of Illinois, have invented certain new and useful Improvements in Antifriction Side Bearings; and I do hereby declare that the following is a full, clear, and exact description thereof, reference being had to the accompanying drawings, and to the letters of reference marked thereon, which form a part of this specification.

This invention relates to improvements in antifriction side bearings and consists of the matters hereinafter described and more particularly pointed out in the appended claims.

The invention relates to the type of side bearing shown in United States Letters Patent No. 1,236,478, of August 14, 1917, granted to H. M. Perry, and is adapted to provide an antifriction side bearing having parts arranged in such manner that they will automatically adjust themselves to the shifting positions of the body and truck bolsters of a railway car, so that the load is at all times transmitted in a full line contact between the antifriction roller and the bearing member with which it engages.

The object of the invention is to produce a bearing of the kind described, so constructed that the various parts will interlock with one another in the assembly of the side bearing, thus eliminating the necessity of a temporary locking means to hold the parts in assembled relation during shipment and reducing the number of parts used in making up the side bearing.

Other objects as well as the several advantages of my improved antifriction side bearing, will more fully appear as I proceed with my specification.

In the drawings:—

Fig. 4 represents a transverse section through the same, the plane of the section being indicated by the line 4—4 of Fig. 1.

Fig. 5 represents a longitudinal, central sectional view through my improved antifriction side bearing, the plane of the section being indicated by the line 5—5 of Fig. 4.

Fig. 6 represents a perspective view of a shaft or axle forming a part of the antifriction side bearing.

Figure 1:
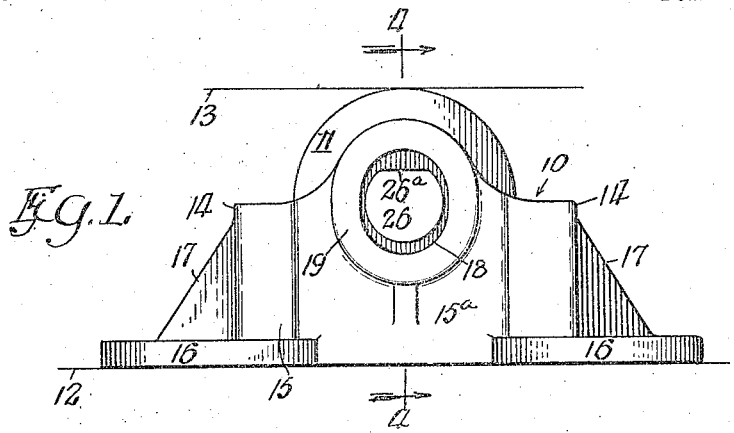
Figure 1 illustrates a view in side elevation of an antifriction side bearing embodying my invention.
Figure 2:
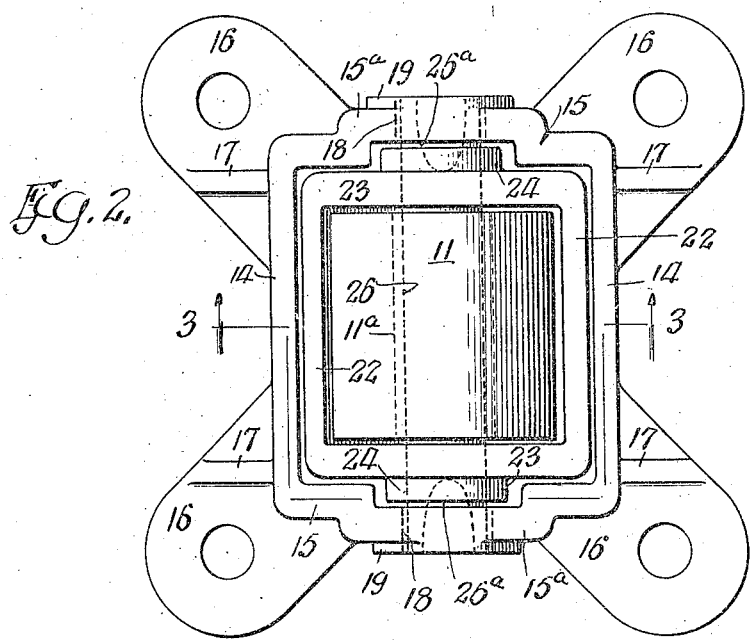
Fig. 2 represents a top plan view of the same.
Figure 3:
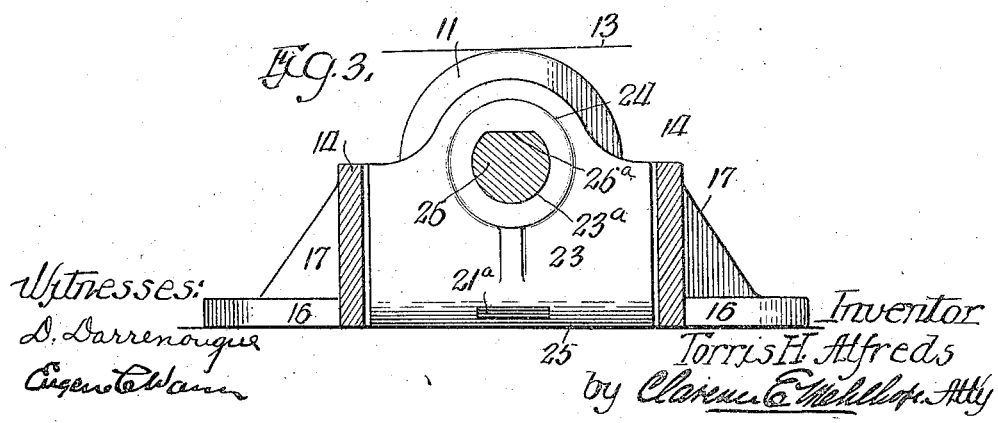
Fig. 3 represents a section through the antifriction side bearing, the plane of the section being indicated by the line 3—3 of Fig. 2.

Referring now in detail to that embodiment of the invention illustrated in the accompanying drawings:—10 indicates a casing, and 11 an antifriction roller contained therein. The antifriction side bearing is herein illustrated as applied to the truck bolster 12 of a railway car, the associated body bolster being indicated by the line 13. The improved antifriction bearing is adapted to transmit load from the body bolster to the truck bolster in a familiar manner, and said truck bolster is illustrated in this instance, as constructed to present a horizontal surface upon which the bearing as a whole rests.

The casing 10 is preferably made substantially rectangular, preferably wider than it is long, and is open at its top and bottom. It has upright end and side walls 14 and 15 respectively, and includes horizontal ears 16 near its bottom edge, by means of which it is attached to the truck bolster 12. A strengthening rib 17 connects each ear 16 with the associated end wall 14.

The side walls 15 have offset parts 15$^a$, in the top ends of which are alined, vertically elongated openings, 18, that are defined by correspondingly shaped, strengthening bosses 19. The offset parts 15$^a$ blend into the side walls 15 in a manner presenting a symmetrical appearance to the casing 10, as a whole. (See Fig. 1). The purpose of the opening 18 will presently appear.

Within the casing 10, and resting upon that part or area of the truck bolster 12 defined by the outline of the casing 10, is a rocker 20 which approximately fills said casing. Said rocker is capable of a limited, rocking movement and is made in the form of an open top, rectangular, comparatively shallow shell, having a horizontal bottom wall 21, upright end walls 22, and upright side walls 23 in which are alined shaft openings 23$^a$. Said side walls 23 have strengthening bosses 24 at their middle, which substantially aline with the bosses 19 on the casing side walls, when said rocker is normally at rest in the casing 10. The bottom surface 25 of the horizontal bottom wall 21 of the rocker, is curved or rounded throughout its length from side to side of the rocker, and in the end parts of said bottom wall are openings 21ª, through which cinders, sand, etc., may escape from the interior of the rocker. The said rounded surface 25 is preferably made with a cylindric surface described about an axis located in the transverse median plane of the rocker, preferably at a considerable distance above the top surface of the antifriction roller 11.

The antifriction element or roller 11 is journaled on a shaft 26 (see Figs. 4 and 6) which is of a length approximating the length of the casing 10, so as to project at its ends beyond the ends of the roller. This shaft is non-rotatively mounted in the openings 23ª of the rocker side walls 23, and a journal sleeve 11ª is secured in the roller 11 which bears on said shaft. As shown, the shaft 26 is cut away or flattened at its ends on one side as at 26ª and the bosses 24 are mashed down upon said flattened parts in the assembly of the side bearing, so as to lock the shaft against any endwise or rotative movement relative to the rocker. The end parts of the shaft 26, which project beyond the sides of the rocker, enter into the vertically elongated openings 18 in the side walls of the casing.

The antifriction bearing is assembled as follows:—A casing 10 is placed top up, on a suitable support, and a rocker 20 is placed in the casing through the open top thereof. A roller 11 with its associated bushing in place, is next placed in the rocker with its shaft opening alined with the holes 23ª in the rocker side walls and the elongated holes 18 in the casing. A shaft 26 is then entered through one of the holes 18, with the flattened parts 26ª uppermost, said shaft being pushed through the holes in the rocker and the shaft opening of the roller, until the ends of the shaft coincide with the outer surface of the side walls of the casing. A maul or other tool is then used to flatten down a part of the bosses on the rocker, when the shaft will be securely locked in place and will also securely lock all parts against accidental displacement, and in a manner providing for all the flexibility between the parts required for its efficient, intended operation.

It is apparent also that the engagement of the ends of the shaft in the elongated holes in the casing, prevents any slipping movement of the rocker in the casing during its operation, without in any way hindering the rocking movement thereof.

When the load is greater at one side of the roller 11 than at its other side, the rocker 20 will rock sidewise of the casing and automatically bring the roller into such position as to present the full line intended contact thereof to the body bolster. The improved side bearing thus provides for the relative rocking or swaying of the body and truck bolsters in their vertical planes and eliminates unequal wear upon the roller 11.

The improved antifriction side bearing comprises but a few parts which so interlock together as to prevent accidental displacement between them, and these parts may be made comparatively small in size and yet withstand the weight or load imposed upon them in use. Another advantage is that the antifriction element may be readily shipped to the place of installation without the danger of coming apart.

I claim as my invention:

1. An antifriction side bearing comprising a casing adapted for attachment to a bolster, a rocker having side members, a shaft engaging with said side members, and a roller on said shaft, said rocker being adapted to rock in said casing in a plane parallel with the axis of said shaft, said shaft locking said rocker in said casing against displacement, but permitting said rocking movement.

2. An antifriction side bearing comprising a casing adapted for attachment to a truck bolster, a rocker having side members, a shaft fixed in said side members, and a roller rotatively mounted on said shaft, said rocker being adapted to rock in said casing in a plane parallel with the axis of said shaft, said shaft engaging with fixed parts of said casing to lock said rocker in said casing against displacement, but permitting said rocking movement.

3. An antifriction side bearing comprising a casing adapted for attachment to a truck bolster, and having holes in its side walls, a rocker having side walls, a shaft fixed in said rocker side walls and extending at its ends beyond the same, a roller rotatively mounted on said shaft, said rocker being adapted to rock in said casing in a plane parallel with the axis of said shaft, the said end extensions of said shaft projecting into said holes in the side walls of the casing.

4. In combination with a truck bolster providing a flat bearing surface, a casing attached to said truck bolster, said casing having vertically elongated holes in its side walls, a rocker having side walls located in said casing, a shaft fixed in said side walls and extending at its ends beyond said side walls, and a roller rotatively mounted on said shaft, said rocker having a rounded bearing surface engaging upon said flat bearing surface, and said shaft extensions projecting into the vertically elongated holes in the side walls of the casing.

5. In combination with a truck bolster providing a flat bearing surface, a casing having apertured side walls, a rocker in said casing having a longitudinally arranged, cylindric bearing surface adapted to rock on said flat bearing surface, a shaft fixed in said rocker and having end extensions projecting beyond the sides of said rocker, said shaft extending transversely to said cylindric bearing surface, and a roller journaled on said shaft, said end extensions of said shaft projecting into the apertures in the side walls of the casing.

In testimony that I claim the foregoing as my invention, I affix my signature in the presence of two witnesses, this 4th day of December, A. D., 1918.

TORRIS H. ALFREDS.

Witnesses:
　D. DARRENOUGUE,
　EUGENE C. WARREN.

Copies of this patent may be obtained for five cents each, by addressing the "Commissioner of Patents, Washington, D. C."